United States Patent

[11] 3,583,798

[72] Inventor Rouel R. Campbell
 3410 Club Drive, Los Angeles, Calif. 90064
[21] Appl. No. 775,091
[22] Filed Nov. 12, 1968
[45] Patented June 8, 1971
 Continuation-in-part of application Ser. No.
 502,803, Sept. 29, 1965, now abandoned.

[54] ROTARY OPTICAL SYSTEM FOR MOTION PICTURES
 19 Claims, 14 Drawing Figs.
[52] U.S. Cl. ................................................. 352/84,
 352/111
[51] Int. Cl. .................................................. G03b 41/00
[50] Field of Search .......................................... 352/84,
 105, 106, 107, 108, 109, 110, 111, 112

[56] References Cited
 UNITED STATES PATENTS
 1,219,221   3/1917   Bauersfeld .................. 352/107

| 2,264,367 | 12/1941 | Eissfeldt ...................... | 352/105 |
| 3,259,448 | 7/1966 | Whitley ........................ | 352/84 |

FOREIGN PATENTS

| 582,637 | 11/1946 | Great Britain ................ | 352/84 |

Primary Examiner—Samuel S. Matthews
Assistant Examiner—Monroe H. Hayes
Attorney—Schapp and Hatch ABSTRACT: A rotary optical system for motion picture cameras and projectors especially suitable for high speed operation, comprises a rotor having circumferentially distributed pairs of mirrors oriented at 45° to the axis of rotation, optical member for directing light through the circumferentially distributed pairs of mirrors and to a focal plane, and a film strip and apparatus for moving the film strip through the focal plane in synchronized fashion with the rotor whereby the image movement obtained by the rotor is synchronized with the film movement through the focal plane so as to eliminate relative movement between the image and film strip during high speed operation. The apparatus also provides improvements in the spacing of the mirrors on the rotor.

PATENTED JUN 8 1971 3,583,798

INVENTOR.
ROUEL R. CAMPBELL
BY Schapp & Hatch
ATTORNEYS

INVENTOR.
ROUEL R. CAMPBELL
BY
Schapp & Hatch
ATTORNEYS

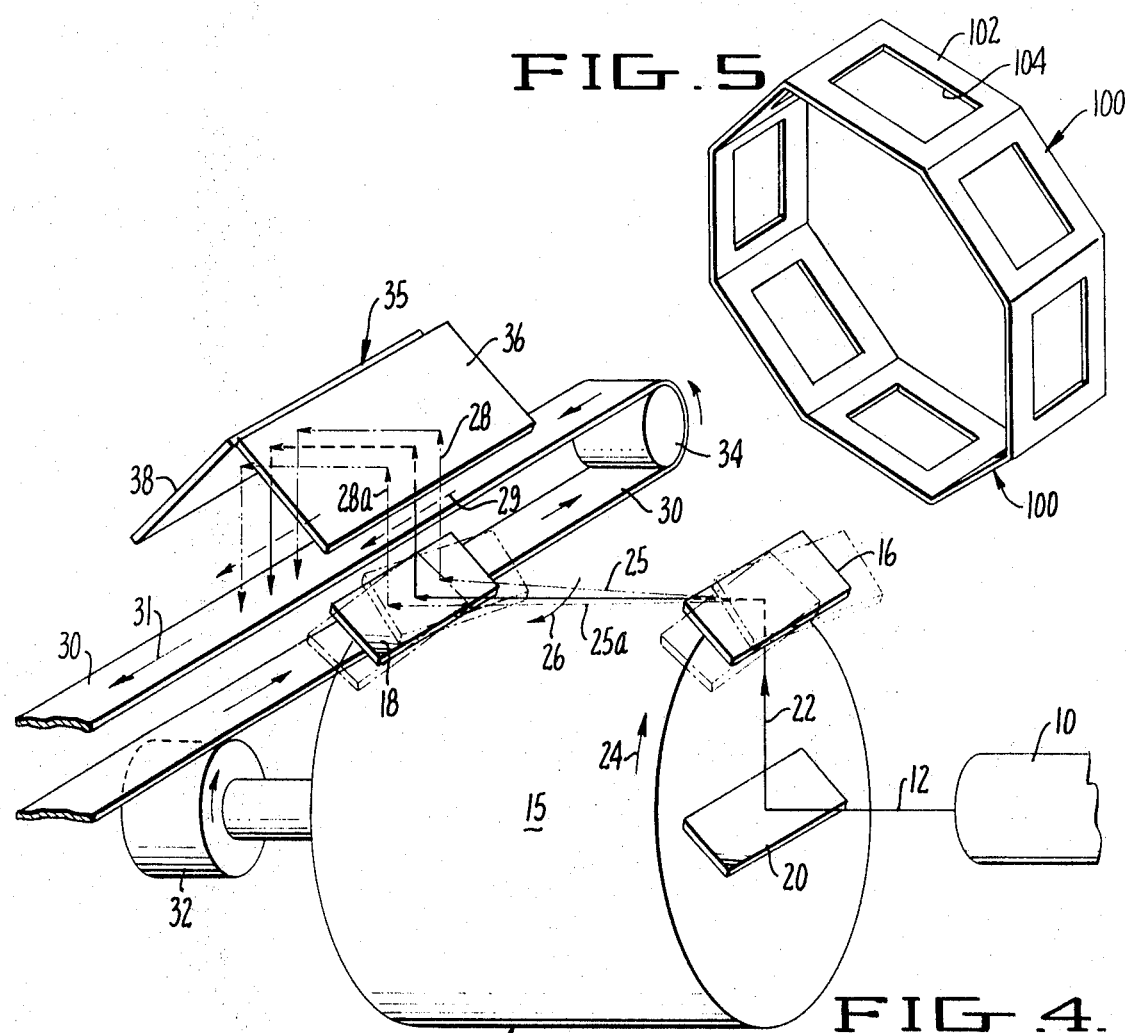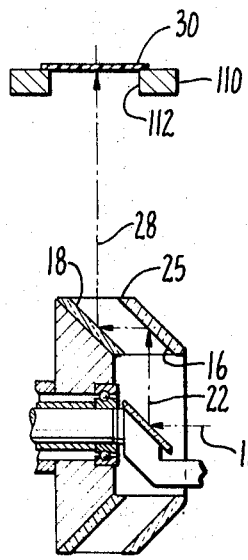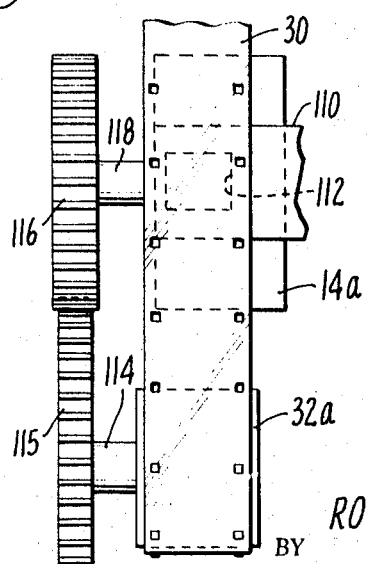

INVENTOR.
ROUEL R. CAMPBELL
BY
Schapps & Hatch
ATTORNEYS

ROTARY OPTICAL SYSTEM FOR MOTION PICTURES

This application is a continuation-in-part of my application Ser. No. 502,803, filed Sept. 29, 1965, now abandoned and entitled "Rotary Optical System for Motion Pictures."

BACKGROUND OF THE INVENTOR

The invention is particularly applicable to high speed motion picture cameras, but it will be appreciated that the optical system and synchronized film transport system will be useable in projectors, if desired, by making the simple rearrangements well known in the art. However, the invention will be discussed in its preferred environment, which is in the high speed motion picture camera.

Science and industry have long felt the need for light weight, compact and relatively inexpensive cameras capable of high speed frame rates of, say, 10,000 frames per second or more. Not only are these high speeds desirable, but it is also desirable to provide such high speeds with steadiness on projection, and excellent sharpness of focus or linearity.

The disadvantages of intermittently starting and stopping the film in high speed cameras are well known, as is the desirability of utilizing a smooth running film together with rotating means for effecting optical compensation of the image so it will occupy the same spot on the moving film throughout the exposure of each frame. Two types of optical compensations have been proposed. On is refraction through rotating prisms and the other is reflection from rotating mirrors or other reflective devices. It is the latter type of compensation with which the present invention is concerned.

Previous high speed cameras have required elaborate gear trains, and extra large rotating components for obtaining the necessary synchronization at the desired speed, and with the desired optical results. Accordingly, it is desirable to provide simplified structure which is capable of operating at a high speed in a reliable manner, and which is easier and less expensive to fabricate.

SUMMARY OF THE INVENTION

The present invention provides a special optical system utilizing the reflective sides of a rhombic configuration to impart rotation of the image received through the objective lens of the camera. This system is particularly advantageous when front surface reflectors or mirrors are utilized as will become more apparent hereinafter.

Accordingly, one advance achieved by this invention is an optical system suitable for use in a motion picture camera employing a rotor with a circumferential series of reflector means without the loss in resolution that usually characterizes a rotary prism optical system. The rotary optical system results in as high a degree of resolution as the best conventional camera.

A second advance of primary importance in high speed photography is the achievement of relatively long exposure periods for any given number of frames per second. As the result of the relative increase in the exposure period, the camera may be operated at a higher speed than otherwise possible for any given intensity of available light.

Another advance is in the fact that when the camera is used for a running record of events or changing conditions the camera may be adapted to provide a surveillance approaching continuous surveillance. In contrast, a conventional high speed motion picture camera keeps a scene under surveillance less than 50 per cent of the elapsed time.

Another advance is the simplicity of the camera construction. There are no reciprocating parts however, the moving mechanism consisting of a single rotor, and film transport drive operates at a substantially constant velocity.

Still another advance is that the rotary optical system is inherently quiet in operation.

The optical rotor that accounts for these advances has a circumferential series of pairs of planar reflector surfaces, each pair being generally equivalent to the reflector surfaces provided by a rhomboidal prism, but preferably formed with surface reflecting means or mirrors. Thus the two planar reflectors of each pair are parallel and spaced apart axially of the rotor with the reflectors facing each other. In the initial embodiment of the invention, the circumference of the rotor is divided into eight successive pairs of the planar reflectors. An additional fixed planar reflector is positioned inside the rotor.

In the preferred practice of the invention, the image-bearing beam of light from the lens of the camera is directed to the fixed planar reflector inside the rotor and is thereby deflected radially outward to be intercepted by the successive pairs of planar reflectors. The two planar reflectors of each pair repeatedly shift the beam in one direction and direct the shifting beam of light outwardly from the rotor to a planar focal position.

It has been found that the described planar reflectors comprising the fixed planar reflector and the circumferential series of planar reflectors may be dimensioned and spatially related to cause the beam to be projected upon a focal plane with the beam repeatedly traversing the focal plane in one direction at a substantially constant rate. Thus it is possible to move a strip of film across this focal plane in the one direction at substantially the same constant rate to result in accurate printing of successive images on the traveling film. The required synchronism between the lateral movement of the beam and the travel of the film that is essential for carrying out the basic concept is achieved either by employing the film to drive the optical rotor or by employing the optical rotor to drive the film.

Thus in the initial embodiment of the invention a film sprocket is mounted on the optical rotor concentrically thereof and the traveling film is led across an exposure plane that is positioned radially outwardly from the sprocket. Since the exposure plane is offset from the optical rotor a pair of additional planar reflectors is employed to divert the beam from the optical rotor to the traveling film.

It is important to provide a carefully and accurately fixed distance between the reflecting surfaces in order to achieve optimum optical results. While this distance is critical, it is a variable depending upon two other factors, which other factors are determined by the mechanical design of the camera. Specifically the length between the mirrors in the parallelgram defined by the two mirrors inclined 45° from the axis of rotation will be approximately equal to one-half the frame length times the sine of one-half of the angle shift represented in degrees of the arc of rotation of each pair of mirrors of the mirror system.

For example, in a typical 16 millimeter frame, the frame length will be 0.300 inches and half a frame will be 0.150 inch. When utilizing eight pairs of mirrors on the rotor, each mirror is rotated in front of the incident light beam from the camera lens one-eighth of 360° or 45° From this, it would be expected that the lens axis swing is one-half of 45° or 22° 30'. However, I have also discovered that a compensation factor must be utilized in order to account for the three dimensional characteristic of the swing, or the fact that the beam of light as it is displaced by the mirror does not remain in one plane.

Stated differently, the beam will sweep the full width or 22½° on the second mirror with the beam traversing an arc while the reflected position traverses a straight line on the mirror. Thus a compensating factor should be used to provide a better match of the image with the film than the above formula provides. When using the sine formula, the compensated angle will be slightly larger, as more fully explained hereinafter. This factor of compensation and the accurate use thereof is extremely important in obtaining excellent linearity when operating in accordance with this invention, and the method of accurately determining this factor of compensation for different systems is fully explained below.

Another feature of the invention is to utilize surface reflecting mirrors so that the light is constantly travelling through an air medium at all times. Although it will be appreciated that rhomboidal prism reflectors are theoretically operative, these prisms have a number of disadvantages as compared with surface reflecting mirrors. For example, the light beam entering the prism is bent slightly as it transfers from the air medium to the glass medium and this bend is toward the perpendicular. Accordingly, the light reflected from the rotating reflecting surfaces within the prism have this bend, and the desired lateral shift is decreased. In order to compensate for this, a longer prism is required and careful calculations are necessary in order to determine and fabricate the desired prism lengths.

Another disadvantage resides in the fact that difficulties arise where refractive angles become large, due to the spectral effect and other effects. Accordingly, a prism embodiment would require more reflective phases so that the angle would be minimized, require longer distance, and thereby result in a larger more bulky optical device which is not as easily rotated at high speeds as a smaller device. In addition, careful spacing of the reflective surfaces requires precision grinding and polishing. For these reasons and other reasons which will be apparent to those skilled in the art, front surface reflectors have considerable advantages and are preferred in the practice of this invention.

BRIEF DESCRIPTION OF THE DRAWINGS

The features and advantages of the invention may be understood from the following description and the accompanying drawings.

In the drawings which are to be regarded as merely illustrative:

FIG. 4 is an oversimplified diagram illustrating the mode of operation of the optical system;

FIG. 5 is a perspective view of an octagonal shutter sleeve that may be incorporated into the optical rotor;

FIG. 6 is a fragmentary sectional view similar to FIG. 2 showing how two fixed reflecting surfaces may be omitted;

FIG. 7 is a plan view of the arrangement shown in FIG. 6 showing how the optical rotor and a drive sprocket may be interconnected by gearing;

Figure 1:
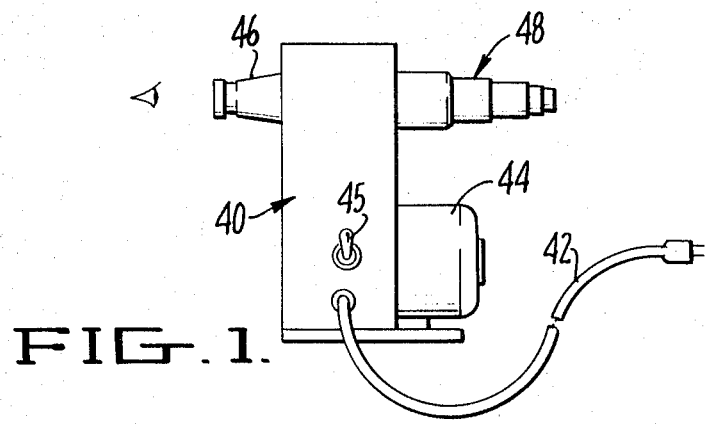
FIG. 1 is a side elevational view of a selected embodiment of the invention in the form of a motion picture camera.

While only the preferred forms of the invention are shown, it should be understood that various changes or modifications may be made within the scope of the claims attached hereto without departing from the spirit of the invention.

The invention may be understood by referring first to the oversimplified diagram in FIG. 4. In FIG. 4 a lens in a barrel 10 directs a beam or bundle of light 12 along the indicated optical axis. A rotary structure 14 is provided having an axis of rotation 15. The rotary structure 14 carries on its circumference a first planar reflector 16 and a second planar reflector 18 which reflectors correspond to the opposite end faces of a rhomboid, the two reflectors facing each other and being inclined at 45° relative to the axis of rotation 15.

A fixed planar reflector 20 inclined at 45° relative to the axis of rotation 15 reflects the beam 12 radially outwardly in a plane of rotation of the reflector 16 for intersection of the radial beam by the arcuately moving reflector 16. The fixed reflector 20 is shown on the axis of rotation 15 with the axis of rotation coinciding with the axis of the beam 12. The important fact, however, is that the reflected portion 22 of the beam is directed radially of the axis of rotation 15 and for this purpose the fixed planar reflector 20 and the light beam 12 need not be on the axis of rotation. In other words the light beam 12 may, if desired, be offset radially from the axis of rotation 15. The first reflector 16 reflects the beam to the surface of the second reflector 18 and the second reflector turns the beam radially outwardly from the rotor.

Since the first reflector 16 moves arcuately through the fixed radial portion 22 of the light beam, it progressively changes its angle relative to the fixed portion of the beam in such manner as to cause the portion of the beam that is reflected from the reflector 16 to shift progressively across the surface of the second reflector 18, the direction of shift being opposite to the direction of arcuate movement of the two reflectors. Thus with the rotor turning in the direction indicated by the arrow 24, the portion 25 of the beam that is reflected by reflector 16 shifts progressively laterally in the general direction of the arrow 26, the maximum shifted position of the beam being indicated at 25a. Consequently the beam portion 25 is shifted across the second reflector 18 and therefore the second reflector produces a radially outward reflected beam portion 28 which shifts progressively to the maximum shifted position indicated at 28a. Since the beam portion 28 shifts linearly and uniformly at a substantially constant speed in the direction of the arrow 29, an image of the subject may be printed on a traveling strip of film that is moving in the same direction at the same rate.

Figure 9:
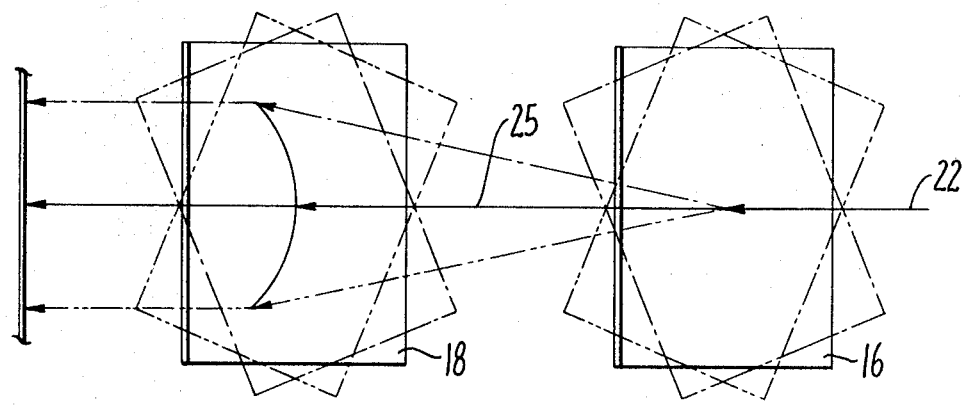
FIG. 9 is a diagrammatic view illustrating the relationship of light movement in space to the mirror movement and positions of reflection therefrom.

As the mirror 16 swings arcuately relative to the fixed portion 22 of the light beam, the light beam traces an arcuate line in space which line conforms to the intersection between the mirror and a plane of rotation through the portion 22 of the light beam, the trace of the beam on the mirror being a straight line (see FIG. 9). It is apparent that the length of the portion 22 of the light beam fluctuates accordingly, since the radial distance of the arcuate line from the axis of rotation of the rotary assembly varies continuously. In this respect, FIG. 4 is oversimplified.

The portion 25 of the light beam that reaches the second mirror 18 also traces an arcuate path in space but traces a straight line on the second mirror as it traverses the width of the second mirror as shown in FIG. 9. It is to be noted that although the portion 25 of the light beam traverses the whole width of the second mirror 18 it moves across the mirror oppositely to the direction of arcuate movement of the mirror and at a somewhat faster rate than the arcuate movement. Thus the light beam that reaches the second mirror 18 sweeps in space in the direction opposite to the direction of arcuate movement of the mirror, the magnitude of the sweep in space being relatively small because the length of an exposed frame on the film is relatively short. It is to be noted that the light beam traces straight lines on both of the mirrors 16 and 18, and the shifted beam that is reflected from the second mirror 18 moves in a direction perpendicular to the axis of rotation or parallel to the entry beam 22.

In this particular embodiment of the invention, the film 30 that is to be exposed passes around a sprocket 32 which may be termed a metering sprocket and which is unitary with the rotary structure 14 to drive the rotary structure. From the metering sprocket 32, the film 30 passes around a guide roller 34 which directs the film into the focal plane of the beam of light from the lens of the camera, the film traveling along the focal plane in the same direction as the arrow 31. For the purpose of displacing the shifting beam 28 onto the traveling film 30, what may be termed a roof reflector, generally designated 35 overhangs the arcuately traveling reflector 18 and also overhangs the film 30 where the film crosses the focal plane of the light beam. The roof reflector 35 may be in the form of an optical prism but preferably comprises a pair of mirrors 36 and 38.

It is apparent from the foregoing discussion of the diagram shown in FIG. 4 and in the diagram of FIG. 9, that the lateral shift of the light beam between the two reflectors 16 and 18 is caused by the arcuate movement of the reflector 16 through the fixed radial portion 22 of the light beam and that for a given rate of rotation of the rotary structure 14 the rate at which the light beam 25 travels along the surface of the second reflector 18 depends upon the distance between the two reflectors 16 and 18. Thus it is possible to adjust the spacing between the two reflectors 16 and 18 to cause the light beam 25 to shift laterally at a substantially matching rate for a given rate of rotation of the rotary structure 14.

It is further apparent that the rate at which the film 30 travels relative to the rate of rotation of the rotary assembly 14 depends upon the diameter of the metering sprocket 32 relative to the effective diameter of the rotary structure 14. However, each frame exposure will be provided from separate mirror pairs. It is a simple matter therefore to select the diameter of the metering sprocket 32 to synchronize precisely the rate of travel of the film 30 in the focal plane so that each frame passes as mirror 16 crosses light beam 22.

Referring again to FIG. 9, it is seen that the light ray 25 is moving in an arcuate path as it reflects from mirror 18, while the reflection positions corresponding to this arc define a straight line. The light is traversing the arc at a constant speed by virtue of the constant rotational velocity of the rotor. Therefore, the light does not move across the line of reflection on mirror 18 at a constant speed, but instead at speed that varies slightly during the sweep.

Prior to this invention, it was assumed that the image displacement (hereinafter referred to as $d_i$) should be equal to the film displacement (hereinafter referred to as $d_f$) at the extreme positions to prevent overlap of exposure while exposing the whole frame. However, this relationship produces a displacement or blur, which is unsatisfactory in most cases, and which can be greatly alleviated by utilizing the optical compensation of this invention.

Figure 10:
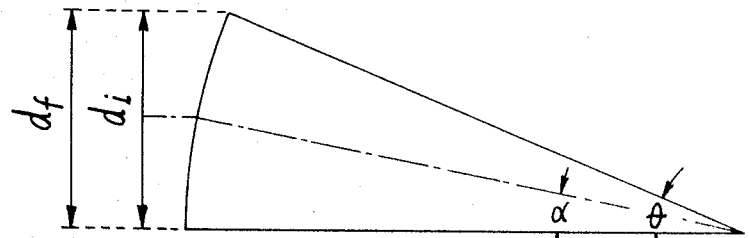
FIG. 10 is a schematic representation showing a comparison of image movement with film movement at exact synchronization of the extreme positions with an eight mirror pair rotor.
Figure 11:
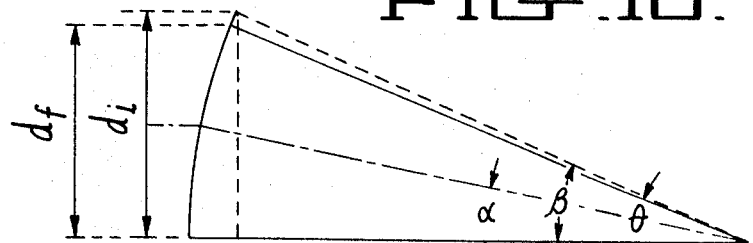
FIG. 11 is a schematic representation showing a comparison of image movement with film movement of a compensated system where the velocity of the image is exactly matched with the velocity of the film at the midpositions of the mirrors with an eight mirror pair rotor.
Figure 12:
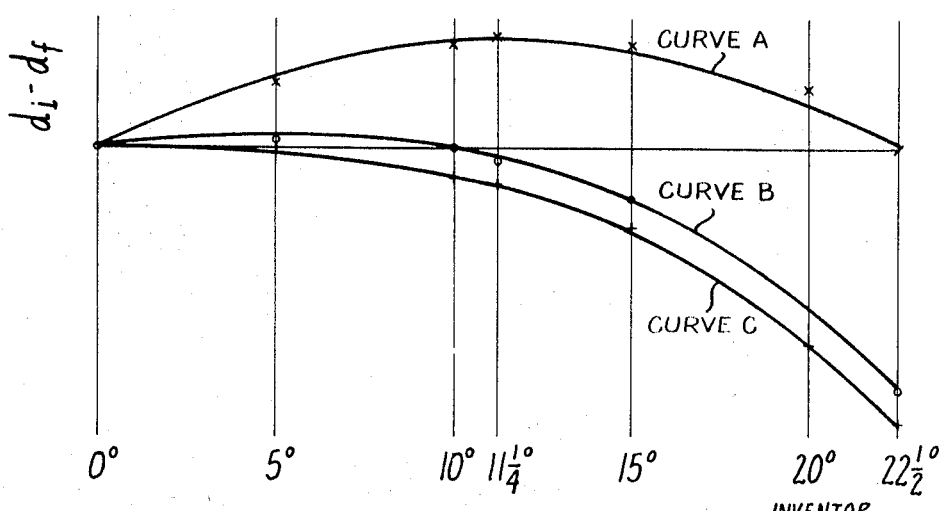
FIG. 12 is a graph showing the displacement of the image with respect to the film during each half arc of rotation of the mirrors on an eight mirror pair illustrating the relations of FIGS. 10 and 11 together with the displacement of a preferred compensated system.

In order to illustrate the principle of compensation of this invention, a comparison of the arcuate and linear movement of the image and film is diagramed in FIG. 10, and the difference between the image displacement $d_i$ and the film displacement $d_f$ is graphed in FIG. 12 to indicate the degree of match. FIG. 11 is a diagram showing a maximum compensation where the image velocity and film velocity are exactly matched at the central position. The displacement of this compensation is also shown in FIG. 12, together with the graph of a preferred compensation.

Referring again to FIG. 10, the distortion is found by calculations based on the situation where the sine of $\theta$ overall matches at the center of the sweep and at the extremes but is out of matching relation throughout each half sweep; maximum distortion being at 11° 15' from center.

These relations for each half sweep are calculated as follows:

Assume a frame length of 0.30 inch for 16 mm. film, which fixes $d_f$ at 0.15 inch for one-half frame length. For the eight pair mirror system, each front mirror rotates 45° through beam of 22½° rotation generating sweep angles of 22½° from center to the extreme of 22½° rotation of the mirrors. Thus $\theta$ is 22½°. From the figure, it is seen that $d_f = d_m \sin \theta$, where $d_m$ is the distance between mirrors. Solving for $d_m$, it is found that $d_m = 0.3920$. Using this value, the $d_i$ can be calculated by the formula $d_i = d_m \sin \alpha$; where $d_m = 0.3920$ and $\alpha$ equals rotation of mirrors from a central axis. The $d_f$ is constant and is calculated as $d_f = 0.15 \, (\alpha 1\theta)$. The results are tabulated in table I below.

TABLE I

| α, degrees | $d_i$ | $d_f$ | $d_i - d_f$ |
| --- | --- | --- | --- |
| 0 | 0 | 0 | 0 |
| 5 | .0342 | .0333 | +.0009 |
| 10 | .0681 | .0667 | +.0014 |
| 11.25 | .0765 | .0750 | +.0015 |
| 15 | .1014 | .1000 | +.0014 |
| 20 | .1341 | .1333 | +.0008 |
| 22.5 | .1500 | .1500 | +.0000 |

From table I, it is seen that the mismatch of image and film is too large to be acceptable for the optical sharpness required in most work. It is also seen that the period of time during which the nonlinearity is large is also large compared to the total exposure time for the frame. This latter relationship is illustrated in the curve A of FIG. 12, said figure showing nonlinearity for various systems.

It has been found, however, that linearity can be improved considerably, and excellent results obtained by utilizing a compensating factor for computing the distance between mirrors and adjusting the mirror distance accordingly to improve linearity. This compensating factor will vary according to the characteristics of the optical system, and therefore it will be explained and demonstrated for certain examples. Generally speaking, the compensating factor is utilized to improve linearity by providing a better match of film speed with image speed, and by averaging out and thereby minimizing nonlinearity.

One possible method of compensation is shown in FIG. 11, in which the length of arc of angle $\theta$ is used to fix the image displacement. The purpose of this is to match the velocities more closely rather than the distances and provide minimal change of linearity at the central position. This increased image displacement provides an automatic and maximum nonlinearity at the extremes, but it should be remembered that the extremes are blocked off by shuttering, some of which is unavoidable.

Using this method of compensation, a new angle $\beta$ is found which is the angle whose sine is equal to $\theta$ in radians or 23° 7'. This angle is then used to determine the distance between mirrors in place of $\theta$. Otherwise the calculations are the same as given above. Thus, for our 16 mm. film of frame length 0.30 inch, the distance between mirrors is found as follows:

$$dm = \frac{0.15}{\sin \beta} = \frac{0.1500}{0.3927} = .3820 \text{ inch}$$

Using this value for the distance between mirrors, the image displacement is calculated and tabulated according to the procedure explained above to yield the results given in table II below.

TABLE II

| α, degrees | $d_i$ | $d_f$ | $d_i - d_f$ |
| --- | --- | --- | --- |
| 0 | 0 | 0 | 0 |
| 5 | .0333 | .0333 | .0000 |
| 10 | .0663 | .0667 | -.0004 |
| 11.25 | .0745 | .0750 | -.0005 |
| 15 | .0989 | .1000 | -.0011 |
| 20 | .1306 | .1333 | -.0027 |
| 22.5 | .1462 | .1500 | -.0038 |

Table II is plotted as curve B of FIG. 12. From table II, it is seen that the nonlinearity is small near the axis, but gets progressively larger toward the extremes. However, if a 240° shutter is used, all values of above 15° will be eliminated, and the optical results would be considerably better than those in table I. It should also be noticed that in table I, the nonlinearity is always positive, while in table II, it is always negative. Thus the preferred area of compensation is between these two systems. Referring again to the graph in FIG. 12, the linearity of the systems of tables I and II are shown together with a graph of a preferred system lying therebetween.

From the above, it is seen that the compensation should be some adjusted angle greater than $\theta$ (one-half of 360° by number of mirror pairs) and less than the angle having a sine equal to the value of $\theta$ in radians. Calling this compensated angle Φ, the distance between mirrors C is represented by the formula $$C = F/2\sine \Phi$$

where F is the length of each exposed frame.

It has been found by experimentation, that excellent results are obtained in a system utilizing eight pairs of mirrors on the rotor for 16 mm. film of 0.30 inch length, when the mirror spacing is adjusted at 0.3834 inch. It will be noticed that this value is between the spacings of the systems of table I and table II, which were 0.3920 and 0.3820 respectively. The linearity is calculated for this preferred system in table III below, and also shown as curve C in FIG. 12:

TABLE III

| α, degrees | $i_d$ | $f_d$ | Non-linearity or displacement |
|---|---|---|---|
| 0 | 0 | 0 | 0 |
| 5 | .0334 | .0333 | +.0001 |
| 10 | .0666 | .0667 | −.0001 |
| 11.25 | .0748 | .0750 | −.0002 |
| 15 | .0993 | .1000 | −.0007 |
| 20 | .1312 | .1333 | −.0021 |
| 22.5 | .1467 | .1500 | −.0033 |

From this data, it is seen that excellent linearity is provided, when using a shutter. For example, when using a 180° shutter, the displacement of image to film is less than about 0.0002 on each half side or a total blur of less than 0.0004 considering displacement doubled for each half angle or total exposure. Since this is the extreme, the actual results are better. With a 240° shutter, maximum displacement of image with respect to film is 0.0007, but three-fourths of the exposure is still with less than 0.0002 displacement.

Thus excellent results are obtained with the system tabulated in table III.

From the foregoing explanation, it is seen that considerable variation may be provided in the defined area of compensation and still achieve excellent results. It is also seen that factors such as shuttering will influence the choice in determining the best optical conditions. However, it is preferred that the compensation for the swing angle of 22½° discussed herein will be such that the image exactly matches the film at a swing angle of between 5° and 15°.

Since the invention is applicable to systems having other than eight mirror pairs completely disposed around the rotor, this preferred compensation is defined generically as follows:

The image speed and the film speed should be in exact alignment both when the central radius of light impinges the surfaces of the inclined mirrors at an angle perpendicular to the surfaces thereof and when the mirrors are rotated therefrom through an arch of from two-ninths to two-thirds of the angle equal to 360° divided by twice the number of mirror pairs in the rotor. Thus with eight pairs of mirrors, the arc is from 5° to 15° from the perpendicular.

In order for the arc to come into exact alignment at 5° for the eight pairs of mirrors, the distance between mirrors is 2.536 times the length of the frame being exposed. At 15° the distance is 2.576 times the length of the frame being exposed. Thus for a frame length of 0.15 inch, the range of the distance between mirrors is from 0.3824 inch to 0.3867 inch.

While the invention has been illustrated with eight pairs of mirrors, it will be appreciated that other numbers could be used if desired. However, it is preferred to use a number of mirror pairs in the range of from six to twelve inclusive. It should also be appreciated that one pair of mirrors would work, if not all of the film is printed. For example, in the eight pair system discussed, removal of seven mirror pairs would operate to print every eighth frame. Accordingly, the definition of mirror pairs should broadly include certain inoperative pairs as well as operative pairs, with the definition used to define the geometry of the system.

By way of example, when twelve mirror pairs are used with a 16 mm. film strip having a frame length of 0.15 inch, the broad range of distance between mirrors is from 0.5729 to 0.5796. A preferred mirror separation would be 0.5741 where $d_i - d_f$ is equal to zero when α is equal to 6°; the maximum positive value of $d_i - d_f$ would be 0.0001 at α = 3°A, and $d_i - d_f$ would be −.0003 at α = 10° or the 240° shutter position. Thus excellent results may be obtained with a 12 mirror pair system.

It is seen that excellent optical results are obtained when using larger numbers of mirror pairs, and the compensation of this invention. However, it is also seen that the mirrors are spaced further apart, and this is not desired, because of the automatic shuttering effect.

Referring again to FIGS. 4 and 9, it is seen that when the second mirror 18 is completely traversed by the light ray 25, the first mirror 16 is not completely traversed by ray 22. Thus there is a period of time during the rotation α that ray 22 will not pass through both mirrors. This period depends on the distance between mirrors and the radius of rotation or length of ray 22. The fraction of time of lost reflection is approximately equal to the length of ray 25 or $M_d \sqrt{2}$ divided by the length of ray 25 plus the length of ray 22. Preferably a shutter is provided, which is formed to prevent this lost reflection from entering the rotating mirror system. However, it will be appreciated that this shuttering principal is only applicable to the 45° mirror inclination shown in the preferred forms.

From the above considerations, it is seen that various factors should be considered in the design of the specific optical system depending upon the tolerances required. It is also seen that the compensation of this invention is advantageous in all cases, but that the exact amount of compensation differs according to the number of mirrors used and the degree of shuttering. Physical considerations are, of course, very important, because large diameter rotors cannot be rotated as fast as smaller rotors.

Figure 2:
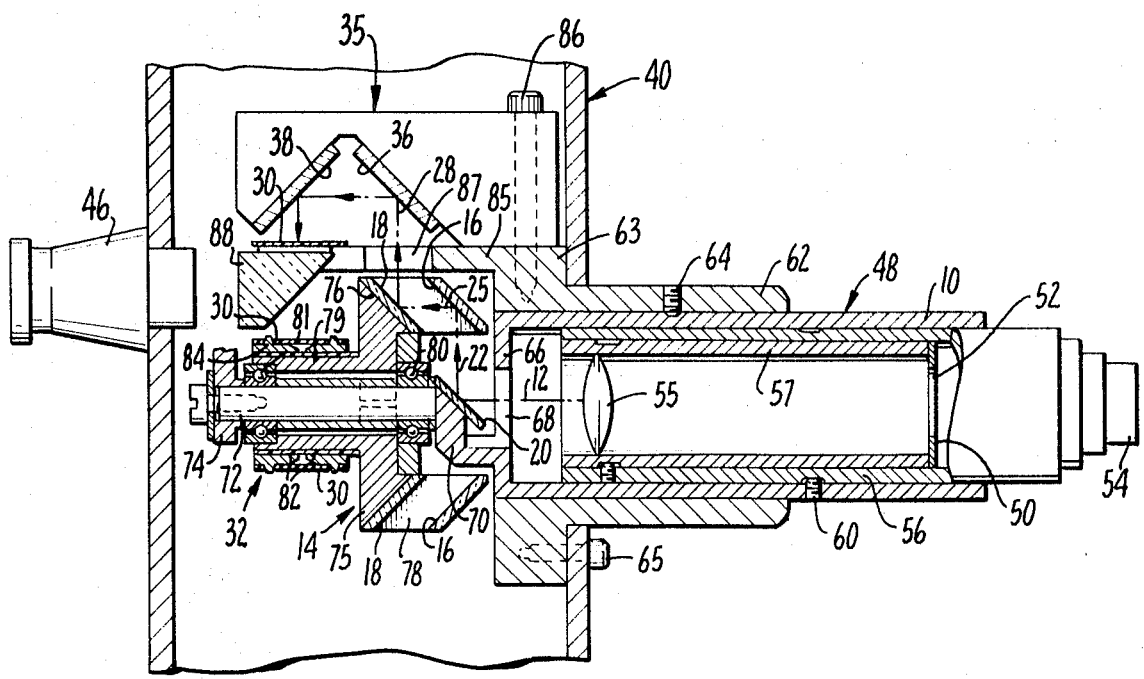
FIG. 2 is a sectional view of the camera as seen along the diameter 2-2 of FIG. 3.
Figure 3:
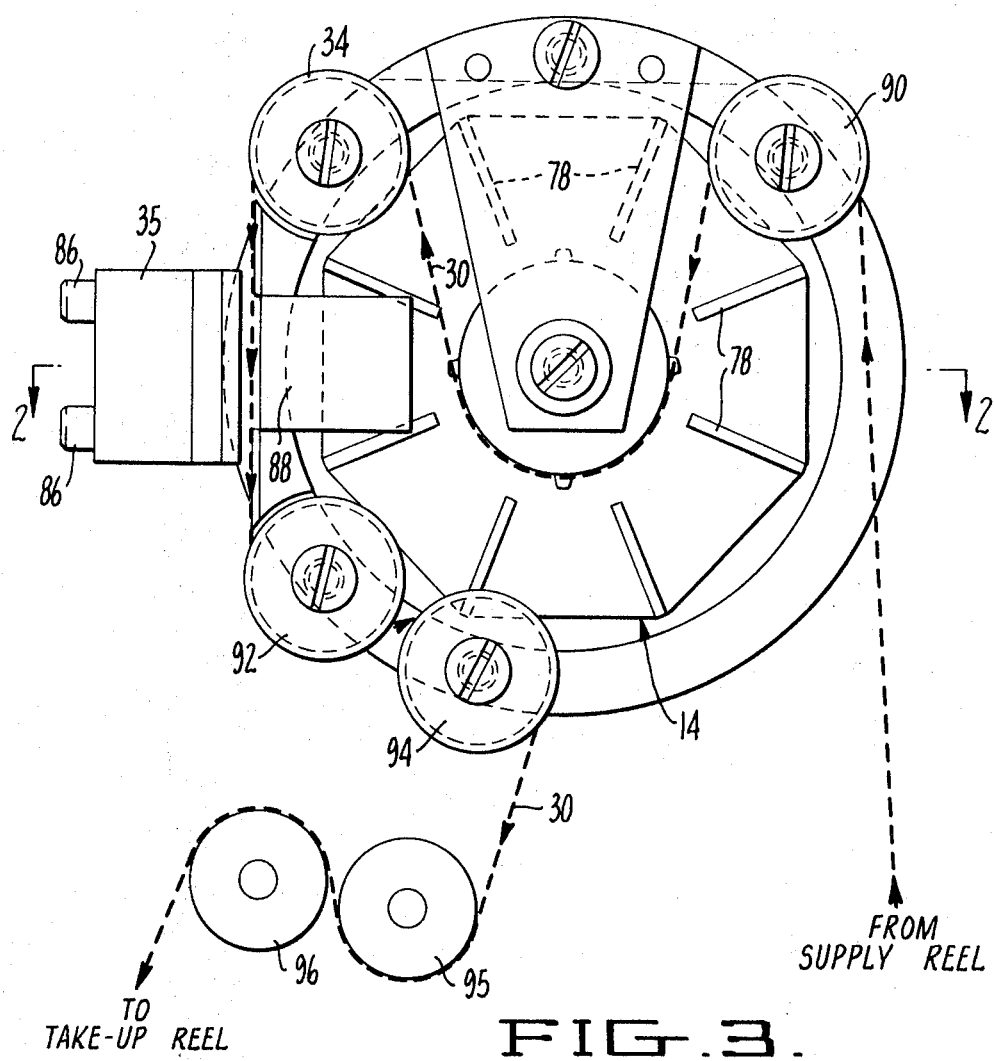
FIG. 3 is a side elevational view of the camera with a sidewall removed to reveal moving parts of the camera including the optical rotor.

FIGS. 1 to 3 indicate how a camera may be constructed to incorporate the principle of operation above illustrated. As shown in FIG. 1, a camera having a housing 40 is provided with an electric cord 42 that may be plugged into a suitable source of electricity for energizing a motor 44 under the control of a switch 45. The camera is further provided with an eyepiece 46 which may be employed to view the image on the focal plane where the film is exposed to the light beam. The lens of the camera is mounted in adjustable tube assembly generally designated 48 in FIGS. 1 and 2.

As indicated in FIG. 2 a transverse plate inside the tube assembly 48 has a rectangular aperture 52 in the focal plane of an objective lens 54 and a secondary objective lens 55 in the tube structure projects an image of the plane of the rectangular aperture 52 onto the focal plane at the traveling film. With the distance along the optical axis between the rectangular aperture 52 and the secondary objective lens 55 the same as the distance along the optical axis from the secondary lens 55 to the focal plane at the traveling film, the magnification is unity, the rectangular image projected onto the traveling film being of the same size as the rectangular aperture 52. An important advantage of this optical arrangement is that the light beam is greatly reduced in cross-sectional area in the region where it is acted upon by the cooperating mirrors 16 and 18. The objective lens 54 may, for example, be a 16 mm. lens with a focal length of one inch and the secondary objective lens 54 may be an achromatic lens having a focal length of 49 millimeters.

The primary objective lens 54 is mounted on a lens tube 56 in an adjustable manner for the purpose of focusing on a subject and the lens tube 56 carries the aperture plate 50 and the secondary lens 55. In the construction shown both the aperture plate 50 and the secondary lens 55 are carried by an inner tube 57 which is fixedly mounted in the lens tube 56 to function as an integral part thereof, the inner tube being positioned to place the aperture plate 50 in the focal plane of the primary objective lens 54.

The lens tube 56 is adjustably mounted in a barrel 10 previously mentioned in FIG. 4 and is retained therein by a set screw 60 which may be loosened for rotary adjustment of the aperture plate 50 relative to the focal plane on the film and adjustable axially for picture size. The barrel 10 is in turn adjustably mounted in a cylindrical extension 62 of a support block 63 and is releasably secured by a set screw 64, the support block being anchored in an opening in the camera housing by suitable screws 65. The barrel 10 has an inner end wall 66 with a window 68 therein and a fixed extension 70 of the barrel carries the previously mentioned fixed planar reflector 20 in the form of a flat mirror.

A previously mentioned rotary structure 14 inside the camera is rotatably mounted on a fixed shaft 72 that is integral with the fixed extension 70 of the barrel 10, the other end of the fixed shaft being supported by an overhanging flange 74 of the block 63. It is contemplated that the circumference of the rotary structure 14 will be divided into any suitable number of equal divisions with each division occupied by a previously mentioned first planar reflector 16 and a corresponding second planar reflector 18. In this particular embodiment of the invention the circumference of the rotary structure is divided into eight subdivisions, each subdivision being occupied by a pair of planar reflectors 16 and 18 in the form of flat mirrors.

For the purpose of mounting the pairs of mirrors 16 and 18, the rotary structure 14 includes a body 75 having a circumferential series of inclined flat faces 76 separated by radial wings or partitions 78. The mirrors 18 are mounted on the eight flat faces 76 and the mirrors 16 are mounted on the outer ends of the partitions 78.

The previously mentioned metering sprocket 32 is unitary with the rotary structure 14 for driving the rotary structure and for this purpose is in the form of a sleeve fixedly telescoped over a tubular extension 79 of the circular body 75, for example by a suitable cement such as an epoxy. Thus the metering sprocket 32 may be considered as part of the rotary structure, the rotary structure being journaled on the fixed shaft 72 by a roller bearing 80 associated with the circular body 75 and a second roller bearing 81 associated with the metering sprocket 32.

A feature of the camera is the manner in which the metering sprocket 32 is fabricated for efficient driving engagement by the film 30. The metering sprocket is made in two halves which at the time of fabrication are permanently bonded together by an intervening layer 82 of a suitable cement such as an epoxy. As may be seen in FIG. 2 each half of the metering sprocket 32 has a circumferential series of sprocket teeth 84. In the procedure of fabricating the metering sprocket 32, the two halves of the sprocket are separately assembled on the tubular extension 79 by the epoxy cement 82 and before the cement cures a piece of the film 30 is wrapped around the sprocket and then the two halves of the sprocket are carefully slightly rotated in opposite directions until the sprocket teeth 84 tighten against the edges of the sprocket holes in the film, the two sets of sprocket teeth opposing each other in the engagement of the film. With the two halves of the metering sprocket adjusted relative to each other in this manner the cement layer 82 is permitted to cure and thereafter the assembled sprocket may be relied upon to engage the film 30 without lost motion or backlash.

The support block 63 provides a web or wall 85 which overhangs the rotary assembly and the previously mentioned roof reflector 35 is mounted on this web by suitable screws 86. The web 85 has a window 87 therein through which the previously mentioned shifting light beam 28 passes to reach the first mirror 36 of the roof reflector 35. The web 85 supports the traveling film 30 in the focal plane of the secondary objective lens 55 and carries a prism 88 under the focal plane to provide the previously mentioned eyepiece 42 with an image of the focal plane.

FIG. 3 indicates how the film 30 passes from a supply reel (not shown) to a guide roller 90 which cooperates with the previously mentioned guide roller 34 to wrap the film around the metering sprocket 32. From the guide roller 34 the film 30 traverses the focal plane and passes around two successive guide rollers 92 and 94. From the guide roller 94 the film 30 passes around a drive sprocket 95 which is actuated by the previously mentioned motor 44 for driving the film and thereby driving the rotary structure 14. From the drive sprocket 95 the film passes around a guide roller 96 to a takeup reel (not shown) which is driven by the motor in a well-known manner.

The manner in which the camera functions may be understood from the foregoing description. The mode of operation is based on the discovery that a pair of rhomboidly positioned reflector surfaces may be positioned and moved arcuately as described to convert a stationary beam of light into a beam shifting laterally in a given direction along a linear path at a constant rate and that with a given rate of arcuate travel by the rhomboidly positioned reflector surfaces, the rate of lateral shift of the beam may be varied by adjusting the spacing between the two reflector surfaces.

In accord with this principle, each revolution of optical rotor creates eight successive laterally shifting beams with the eight radial partitions 78 intercepting the light beam momentarily between the successive lateral sweeps. A feature of the invention is that the radial shutter elements 78 may be thin relative to the light beam that they intercept with the consequence that the traveling film is exposed to a portion of the light a maximum per cent of the elapsed time.

In this mode of operation, the successive images are printed end to end on the traveling film with uniform exposure of each image. The uniformity of exposure may be understood when it is considered that each of the radial shutter elements 78 travels across the stationary portion 22 of the light beam somewhat edgewise to the light beam and thus affect the whole area of the image uniformly. For subsequent use of the film in a motion picture projector, it is essential that the images be correctly positioned relative to the sprocket holes in the film and for this purpose the metering sprocket 32 may be adjusted by rotation to a correct rotary position and may also be adjusted axially to line up with the rollers 34 and 90.

As may be readily understood, a critical dimension is the distance between a mirror 16 and a mirror 18 as measured parallel with the axis of rotation 15 since this distance determines the rate of lateral shift of the successive beams relative to the rotation of the rotary assembly. For any given diameter of the metering sprocket 32, there is a specific magnitude of this dimension that will equalize the rate of lateral shift of the portion 28 of the light beam with the peripheral rate of rotation of the metering sprocket 32 as required for synchronization of the film and the light beam at the focal plane of the film.

This critical dimension may be ascertained either by calculation as shown above, or by calibration on an optical bench. In fact, the compensation disclosed herein was discovered by calibration on an optical bench. With the critical dimension known, the corresponding spacing of the mirrors 16 and 18 as measured perpendicular to their faces may be ascertained and a guage block of precisely the dimension of this spacing may be used for correct positioning of mirrors 16 and 18 in the course of assembling the rotary structure.

None of the other dimensions are critical except for the fact that the distance along the optical axis from aperture plate 50 to the secondary lens 55 must approximate the distance along the optical axis from the secondary lens to the focal plane of the film.

The inner edges of the mirrors 16 and 18 are spaced 0.468 inch from the axis of rotation but this distance is not critical to the lateral shift. This fact may be understood when it is considered that the angular movement of a mirror 16 relative to the fixed portion 22 of the light beam is determined by the degrees of rotation at any radial distance the mirror may be positioned.

In some practices of the invention, maximum surveillance is desirable because of the long exposure period of each frame. If, for example, 24 frames per second are required suitable shutter means may be provided to shorten the exposure time for each frame with the blank spaces on the film by the successive frames.

FIG. 5 shows what may be termed a shutter sleeve 100 of octangular configuration providing eight octangular faces 102. The sleeve 100 is made of thin opaque material and each of the faces 103 has a rectangular aperture 104 that measured circumferentially of the sleeve is shorter than the face 102. The shutter sleeve 100 may enclose the eight pairs of mirrors 16 and 18 so that the portion 28 of the light beam shown in FIG. 2 will be periodically cut off by the shutter sleeve. If desired the shutter sleeve may be made of smaller diameter to be mounted on the optical rotor inside of the eight pairs of mirrors 16 and 18. In such an arrangement the shutter sleeve would periodically cut off the fixed radial portion 22 of the light beam.

The advantage of using the roof-shaped reflector 35 to offset the light beam from the plane of rotation of the mirrors 18 is that it simplifies the problem of synchronizing the travel of the film with the rotation of the optical rotor, the film being employed to drive the optical rotor. The disadvantage of such an arrangement, however, is a certain light loss at the two reflecting surfaces 36 and 38 of the roof-shaped reflector 35. FIGS. 6 and 7 show how this light loss may be avoided by positioning the traveling film in a focal plane that is intercepted by the successive shifting light beams 28 that are reflected outward from the mirrors 18. FIG. 6 shows how the film 30 may be guided by support structure 110 in a focal plane that is intercepted by the successive shifting light beams 28, the support structure having an aperture 112 for access to the focal plane. FIG. 7 shows a sprocket 32 for pulling the film 30 across the upper surface of the support structure 110. The sprocket 32a is mounted on a shaft 114 which carries a gear 115. The gear 115 meshes with a second gear 116 and the second gear drives a shaft 118 on which a rotary structure 14a is mounted for rotation therewith. It is apparent that either the gear 15 or the gear 16 may be motor driven for synchronous rotation of the film sprocket 32a and the rotary structure 14a.

Figure 8:
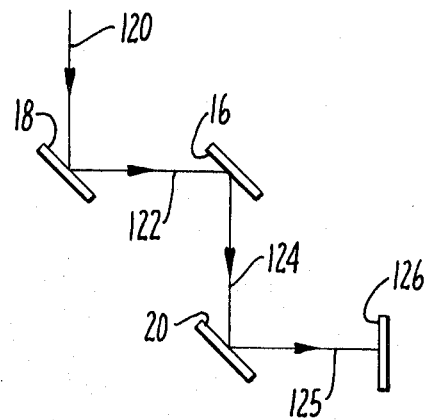
FIG. 8 is a diagram showing how the direction of the light path through the optical rotor may be reversed.

FIG. 8 shows diagrammatically how the direction of the light beam through the optical rotor may be reversed. In FIG. 8 the incoming light beam 120 is directed along a line that is generally radially of the axis of rotation, just as in the first described embodiment of the invention, the incoming light beam 22 is directed along a line that is generally radially of the axis of rotation. The fixed light beam 120 is first intercepted by a reflecting surface 18 instead of a reflecting surface 16. The angular movement of the reflecting surface 18 causes the beam to swing laterally as it is directed towards the reflecting surface 16, the laterally swinging beam being designated 122. As in the first embodiment of the invention, the result of the laterally swinging of the beam 122 is that the beam 124 reflected radially inwardly by the reflecting surface 16 shifts laterally in one direction at a constant rate. As a result the successive reflected beams 125 also shift laterally and thus sweep along a focal plane at a film 126.

In the second embodiment of the invention the arcuate swinging movement of the beam between the two reflecting surfaces is through the same angle as in the first embodiment of the invention and the beam 124 that is reflected from the reflecting surface 16 shifts in the same direction as the rotation of the optical rotor instead of shifting in the opposite direction.

Figure 13:
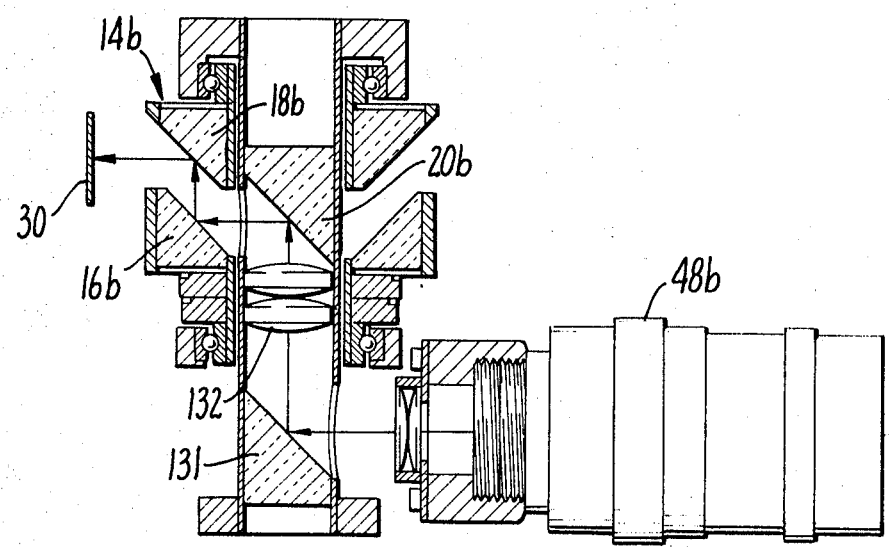
FIG. 13 is a view, partly in section, illustrating a preferred optical system constructed according to the invention.
Figure 14:
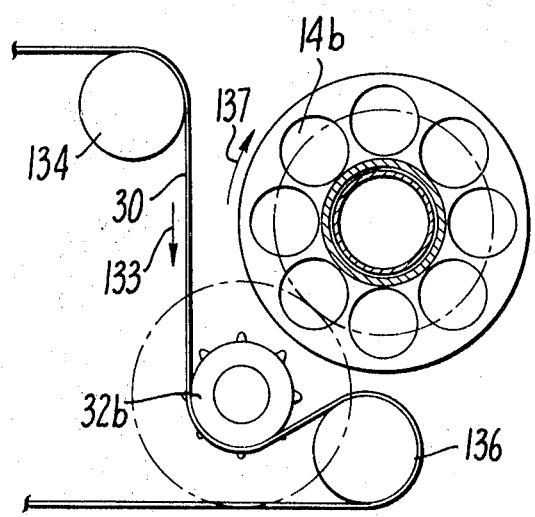
FIG. 14 is a schematic view of the embodiment of FIG. 13, illustrating the synchronism of the rotor and film strip.

Another embodiment is shown in FIGS. 13 and 14, in which the light is reflected from an even number of mirrors to provide a preferred image orientation. As there shown, light enters the camera through an objective lens system 48b, reflected by a first fixed reflector 131 through condensing lenses 132 to a second fixed reflector 20b, and through rotor 14b to film 30. Rotor 14b is similar to rotor 14, being mounted for high speed rotation on precision ball bearings and having eight pairs of mirrors 16b and 18b circumferentially mounted thereon.

As shown in the diagram of FIG. 14, film 30 is moved in the direction of arrow 133 over idler 134, past sprocket 32b, and over idler 136 to a takeup device (not shown). The sprocket 32b is geared to the rotor 14b through spur gears indicated by the phantom lines in FIG. 14, so that rotor 14b rotates as shown by arrow 137 in synchronized movement with the film 30. It will be appreciated that the size of sprocket 32b and the sizes of the spur gears may be varied to accommodate various design changes, such as would be required if a different number of mirror pairs were used or the film size changed.

My description in specific detail of the selected embodiment of the invention will suggest various changes, substitutions and other departures from my disclosure within the spirit and scope of the appended claims.

I claim:

1. In a camera, the combination of:
a power driven rotary structure having an axis of rotation;
a first circumferential series of planar reflectors on the rotary structure;
a second circumferential series of planar reflectors on the rotary structure;
said second circumferential series of planar reflectors on the rotary structure being spaced axially from the first series, the reflectors of the two series being paired with the reflectors of each pair facing each other; and
a fixed planar reflector on said axis in a plane of rotation of the first series of reflectors positioned to direct said beam radially outward along the plane of rotation to the first series of reflectors,
the reflectors of the first series being positioned to reflect the beam of light to the corresponding reflectors of the second series, with the arcuate movement of each reflector of the first series causing lateral swing of the beam to shift the beam across the surface of the corresponding second reflector,
the reflectors of the second series being positioned to direct the shifting beam outward from the rotary structure;
a rotary means to engage a strip of light-sensitive material, said rotary means being unitary with the rotary structure coaxially thereof and spaced axially of the rotary structure from the two series of reflectors;
means to direct the strip along a focal plane spaced radially outward from the rotary means;
means to direct the beam from the second series of reflectors onto the strip at the focal plane; and
means to rotate the rotary structure and to drive the strip in synchronism with the shift of the beam from the reflectors of the second series.

2. In a camera, a combination as set forth in claim 1 which includes shutter means fixedly carried by the rotary structure, said shutter means being positioned symmetrically relative to the axis of rotation of the rotary structure and having a series of apertures corresponding to one of said circumferential series of planar reflectors.

3. In a camera, a combination as set forth in claim 1 in which said means to direct the light beam from the second series of reflectors onto the strip comprises two planar reflectors at an acute angle to each other to serve as a roof-shaped reflector means.

4. A camera as set forth in claim 3 in which said roof-shaped reflector means is adjustable as a unit.

5. In an optical system for exposing a strip of light-sensitive material to a succession of images of a subject, the combination of:
means to move said strip longitudinally in a given focal plane;
rotary structure having a given axis of rotation;
optical means to transmit a beam of light from the subject onto the moving strip, said optical means including a fixed planar reflector inside the rotary structure and a circumferential series of pairs of planar reflectors on the rotary structure,
said fixed planar reflector being at an acute angle to said axis and facing outwardly from the axis to reflect the beam outward,
each of said pairs comprising a first planar reflector to intercept the outward beam and a second planar reflector parallel to the first planar reflector and spaced therefrom axially of the rotary structure whereby the first planar reflector causes the beam to sweep in one lateral direction through a range of angles between the first and second reflectors to cause the beam to shift along the second reflector and to cause a shifting beam to be reflected radially outward from the second reflector;

means to rotate the rotary structure and to drive the strip at a constant rate in synchronism with the shift of the beams from the second reflectors; and shutter means fixedly carried by the rotary structure, said shutter means having a circumferential series of fixed apertures corresponding to the pairs respectively of the planar reflectors.

6. A combination as set forth in claim 5 in which said shutter means is inside the circumference defined by the inner edges of the pairs of planar reflectors.

7. A combination as set forth in claim 5 in which said shutter means is outside of the outer circumference of the series of pairs of planar reflectors.

8. In an optical system for exposing a strip of light-sensitive material to a succession of images of a subject, the combination of:

means to move the strip longitudinally in a given focal plane;

a rotary structure having a given axis of rotation;

optical means to transmit a beam of light from the subject radially outwardly through the rotary structure;

means to direct the radially outward beam onto said focal plane, said directing means including a circumferential series of pairs of reflectors on said rotary structure, each of said pairs comprising a first planar reflector and a second planar reflector parallel to the first planar reflector and spaced therefrom axially of the rotary structure, said two planar reflectors facing each other, the first reflector being positioned to intersect the radially directed beam and to reflect the beam laterally through a range of angles to the second planar reflector to cause the beam to shift across the second reflector, the second reflector being positioned to reflect the shifting beam radially outwardly from the rotary structure;

means to rotate the rotary structure and to drive the strip at a constant rate synchronized with the shift of the beam from the second reflectors, said focal plane being spaced radially outward from the outer circumference of the rotary structure; and additional planar reflectors to reflect the beam from said second planar reflectors onto the focal plane.

9. In an optical system for a device such as a camera or the like employing a strip of film, the combination of:

means to move said strip longitudinally in a given focal plane;

a rotary structure having a given axis of rotation;

optical means to transmit a beam of light along a path between the interior of the device and the exterior of the device with the beam intersecting said strip, said optical means including a fixed planar reflector inside the rotary structure and a circumferential series of pairs of parallel planar reflectors on the rotary structure, said fixed planar reflector intersecting the axis of rotation of the rotary structure and facing outwardly from the axis to cooperate with the pairs of reflectors, each of said pairs of planar reflectors being spaced apart axially of the rotary structure and being positioned radially outwardly from the axis of rotation of the rotary structure; and means to rotate the rotary structure and to drive the strip in synchronism.

10. An optical system for a high speed motion picture camera employing a strip of film and constructed to expose successive frames along the strip, comprising means to move said strip longitudinally through a focal plane, a rotor having a plurality of matched pairs of opposed mirrors circumferentially disposed thereon, and means for coupling the movement of the film strip to the rotational movement of the rotor whereby the film movement is matched with the lateral movement of the sweeps caused by the rotor movement, said mirrors being inclined with respect to the axis of the rotor and having opposed parallel reflecting surfaces disposed for receiving a ray of light from outside the camera through the objective optical system thereof and directing the ray of light toward the focal plane whereby rotation of the rotor causes said light ray to move laterally in a sweep motion as each matched pair of mirrors intercepts the ray of light, and said mirrors being spaced apart at an accurately adjusted distance determined by the length of the exposure frame and the angle of rotation of the mirrors to match the velocity of sweep of the image with the movement of the film strip at the desired length of exposure frame, said distance between mirrors being determined by the formula:

$$d_m = F \sin \Phi/2$$

where $d_m$ is the distance between the parallel planes of the reflecting surfaces of the mirrors, F is the frame length, and $\Phi$ is a compensated angle lying in the range extending between an angle $\theta$ and the angle whose sine is equal to the value of $\theta$ in radians, where $\theta$ is an angle equal to one-half of 360° divided by the number of mirror pairs on the rotor.

11. The optical system defined in claim 10, in which a shutter is provided which is formed to rotate in synchronized fashion with the rotor and prevent light from passing through the rotor at the positions of intersection of the optical axis with the boundaries of angular change of the first mirrors formed to receive light and an evenly spaced distance on each side thereof, the total shuttering time for each revolution of the rotor being a minimum of time represented by a fraction of the period of each revolution of the rotor, said fraction being equal to the distance the light travels between the matched pairs of mirrors of the rotor divided by the sum of the distance the light travels between said pairs of mirrors of the rotor plus the optical radius of revolution of said mirrors.

12. An optical system for a high speed motion picture camera employing a strip of film and constructed to expose successive frames along the strip, comprising means to move said strip longitudinally through a focal plane, a rotor having a plurality of matched pairs of opposed mirrors circumferentially disposed thereon, and means for coupling the movement of the film strip to the rotation of the rotor whereby the film advances a distance equal to the length of one frame when the rotor rotates through the angle determined by each matched pair of opposed mirrors, said mirrors being inclined with respect to the axis of the rotor and having opposed parallel reflection surfaces disposed for receiving a ray of light from outside the camera through the objective optical system thereof and directing the ray of light toward the focal plane whereby rotation of the rotor causes said light ray to move laterally in a sweep motion as each matched pair of mirrors intercepts the ray of light, and said mirrors being spaced at a distance such that the image and the film are in exact alignment at the central reference position when the central axis of the light ray impinges the surfaces of the inclined mirrors at an angle perpendicular to the transverse axes and when the mirrors are rotated from said reference position through an arc of from two-ninths to two-thirds of the angle equal to 360° divided by twice the number of mirror pairs on the rotor.

13. The optical system defined in claim 12, in which a shutter is provided which is formed to rotate in synchronized fashion with the rotor and prevent light from passing through the rotor at the positions of intersection of the optical axis with the boundaries of angular change of the first mirrors formed to receive light and an evenly spaced distance on each side thereof, the total shuttering time for each revolution of the rotor being a minimum of time represented by a fraction of the period of each revolution of the rotor, said fraction being equal to the distance the light travels between the matched pairs of mirrors of the rotor divided by the sum of the distance the light travels between said pairs of mirrors of the rotor plus the optical radius of revolution of said mirrors.

14. The optical system defined in claim 12, in which the number of pairs of mirrors on the rotor is in the range of six to 12 inclusive.

15. An optical system for a high speed motion picture camera employing a strip of film and constructed to expose successive frames along the strip, comprising
    means to move said strip longitudinally through a focal plane,
    a rotor having eight matched pairs of opposed mirrors circumferentially disposed thereon with the reflective surfaces of the mirrors defining parallel planes
    means for coupling the movement of the film strip to the rotation of the rotor whereby the film advances a distance equal to the length of one frame when the rotor rotates through the angle determined by each matched pair of opposed mirrors,
    said mirrors being spaced such that the distance between the parallel planes thereof is from 2.536 to 2.576 time the length of the frame being exposed.

16. The optical system defined in claim 15, which is adapted to use a film strip of 16 mm. film with frame lengths of 0.15 inch, and the distance between mirrors is 0.3834 inch.

17. The optical system defined in claim 16, in which a rotating shutter is provided which is formed to rotate with the rotor and block light eight times per rotor revolution, said shutter blocking off the light received from the objective lens from about one-third to about one-half of the time.

18. An optical system for a device employing a strip of film such as a high speed motion picture camera, comprising
    means to move said strip longitudinally through a focal plane,
    a rotor having a plurality of matched pairs of opposed mirrors circumferentially disposed thereon, said plurality being in the range of six to 12 inclusive,
    said mirrors being front surface reflectors and inclined with respect to the axis of the rotor and having opposed parallel reflecting surfaces disposed for directing a ray of light between a position radially outward from the mirrors of the rotor and a position radially inward from the mirrors of the rotor whereby light moving from one of said positions toward the other of said positions is caused to move laterally in a repetitive sweep motion as the rotor rotates with each sweep corresponding to the rotation of each matched pair of mirrors through the ray of light, said film strip also being positioned to receive light passing through the rotor in said sweeps,
    means for coupling the movement of the film strip to the rotational movement of the rotor whereby the film movement is matched with the lateral movement of the sweeps caused by the rotor movement, and
    a shutter formed to rotate in synchronized fashion with said rotor and having elements positioned to prevent light from passing through the rotor at the positions of intersection of the optical axis with the boundaries of the first mirrors and formed to block light through an evenly spaced distance on each side thereof, said shutter also being sized to provide a total shuttering time for each revolution of the rotor equal to or in excess of a fraction of the period of each revolution of said rotor, said fraction being equal to the distance the light travels between the matched pairs of mirrors of the rotor divided by the sum of the distance the light travels between said pairs of mirrors of the rotor plus the optical radius of revolution of said mirrors.

19. The optical system defined in claim 18, and in which an aperture is provided to define an opening formed to pass light therethrough which will match the desired exposure area for each frame on the film strip.